Nov. 20, 1962  R. W. HICKMAN  3,065,466
RECORDING OF SHEET MATERIAL MEASUREMENT DATA
Filed Sept. 23, 1959
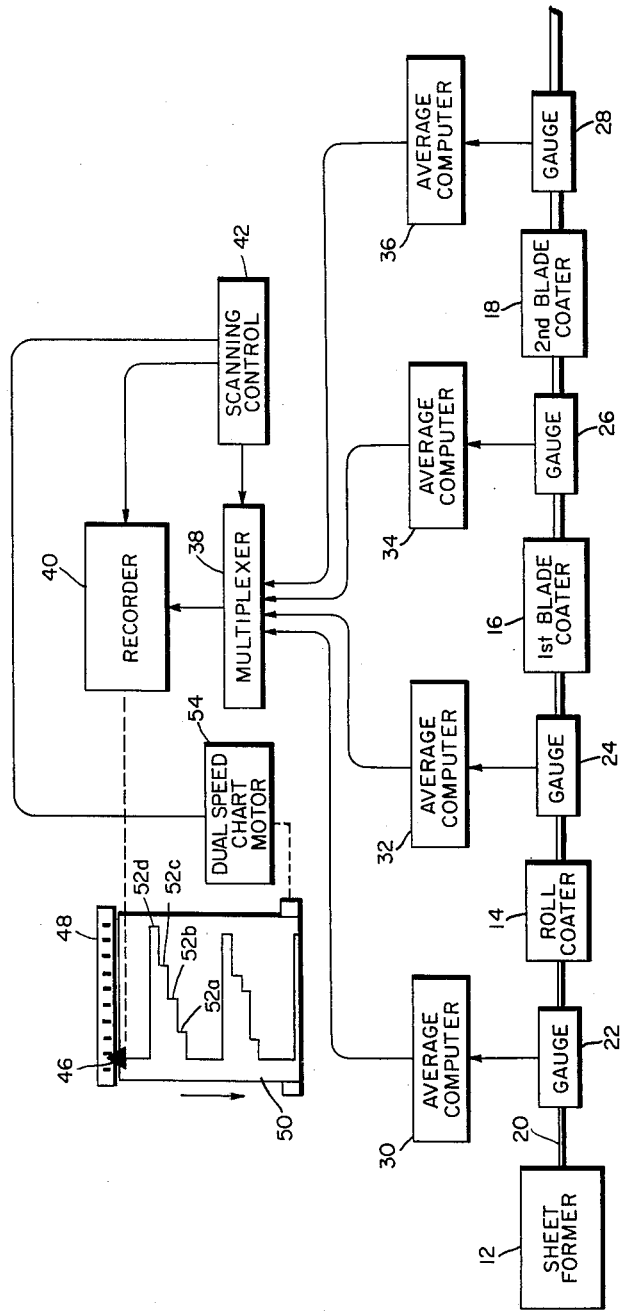
INVENTOR
Richard W. Hickman
By Anthony D. Cennamo

United States Patent Office 3,065,466
Patented Nov. 20, 1962

3,065,466
RECORDING OF SHEET MATERIAL
MEASUREMENT DATA
Richard W. Hickman, Columbus, Ohio, assignor to Industrial Nucleonics Corporation, a corporation of Ohio
Filed Sept. 23, 1959, Ser. No. 841,787
9 Claims. (Cl. 346—1)

This invention relates to continuous sheet measuring apparatus and more particularly to an improved system for recording the measurements in a novel manner such that the record facilitates the interpretation of the cumulative effect of progressive alterations of the sheet.

The invention will be illustrated and described in connection with a paper coating process but it will be understood that the novel concepts may be readily applied to other industrial processes with equally acceptable results. In the paper coating process, several coats of kaolin, starch and other ingredients are successively applied to dry paper to produce a sheet having a slick surface. At times, more than one coat is required to produce paper having the desired finish. The amount of coating applied each time is an important factor governing the quality of paper produced by the process.

Generally, operators have had no way to conveniently observe the overall operation of the process. It has been exceedingly difficult to determine the relative amounts of coating applied to the base sheet at different stages of the process and it has been impossible to observe long term trends or drifts in the basis weight of the sheet from specification at the different stages without employing expensive analog computers or laboriously scrutinizing and comparing several different chart records. Operating personnel had to observe a myriad of wildly fluctuating recorder traces and visually estimate the weight of each coating and the relative weights of coating applied in each stage.

To overcome these disadvantages, the present invention provides a plurality of radiation gauges concomitantly scanning the sheet to measure the cross-sheet weight of the paper before the initial coat is applied and after each additional coat. A computer is connected to each gauge to derive a signal indicative of the average weight of the sheet at the end of each scan. The output of each computer is sequentially read out on a strip chart recorder at the end of each scan of the gauges in both directions of travel across the sheet. The recording pen is horizontally displaced in accordance with the computed average. During the scanning period the recorder pen is clamped at the extreme left-hand edge of the strip chart. A series of step traces are produced on a single chart in the form of a bar graph from which the process may be readily evaluated.

Accordingly, it is a primary object of the present invention to provide a recording system which produces a compact record summarizing the overall operation of a multi-stage industrial process.

It is another object of the present invention to provide operating personnel wtih method and means for rapidly determining the relationship of long term trends or drifts in the basis weight of a sheet between any of several stages of a multi-stage industrial process.

It is an additional object of the present invention to provide a recording system for producing a record which may be readily interpreted by persons having little or no technical knowledge.

Besides these objects, many other advantages as well as numerous features of the present invention will become more apparent from the following description taken in conjunction with the drawings, in which the single figure diagrammatically illustrates a paper sheet coating process comprising one preferred embodiment of the present invention.

With reference to the single FIGURE, a typical sheet-coating process utilizes a sheet former 12, a roll coater 14, a first blade coater 16 and a second blade coater 18. The sheet former 12 may include a paper machine of the Fourdrinier type and several press and dryer rolls. A substantially dry paper sheet 20 traveling in the direction indicated engages the coater 14 where kaolin and starch materials are rolled onto the surface of the sheet 20. After drying, the sheet continues to the blade coaters 16 and 18 where additional coats are applied. The emerging sheet 20 issues with a high gloss and is suitable for binding into books, after subsequent processing through supercalenders which impart an improved finish to the sheet.

The amount of material deposited on the base sheet 20 by each coater determines the quality of the produced sheet. The dynamic nature of such a multi-stage process has made it difficult for operating personnel to determine the magnitude and direction of inevitable drifts in the weight of the paper from one stage to the next. In general, it has been impossible to obtain an accurate and consolidated record of the overall operation of the process.

To obtain a comprehensive analysis of the illustrated process the present invention provides a plurality of product sensors which preferably comprise radiation gauges 22–28 mounted to engage the sheet 20 emerging from the material former 12 and each coater 14–18. The gauges are adapted to scan across the sheet 20 in unison and to pause upon reaching the opposite edge while computed average basis weights are sequentially recorded. The gauges may be of the transmission type to generate a signal indicative of the instantaneous variations in cross-sheet basis weight of the sheet 20 at each of the respective measuring locations. For a more detailed explanation of a gauge suitable for use at 22—28, reference may be had to U.S. Patent No. 2,790,945, issued to H. R. Chope on April 30, 1957.

An average computer 30–36, which may be an integrating capacitor, is connected to the output of each gauge to provide a signal indicative of the average cross-sheet basis weight of the sheet at every stage. The outputs of the computers 30–36 are sequentially connected by a multiplexer 38 to a recorder 40 in response to a command signal from a scanning control unit 42. Recorder 40 is preferably of the strip chart type having a recording pen 46 laterally movable across a scale 48 calibrated in units such as pounds per ream and a chart 50 in registration therewith.

In accordance with the present invention, after each scan of the gauges 22–28, the outputs of the average computers 30–36 are individually presented on the chart 50 as a stepped trace 52. Short vertical line segments 52a, 52b, 52c, and 52d of the trace are scribed at the computed average of the variations in cross-sheet weight as detected by gauges 22–28 respectively. During a scan, however, the recorder pen 46 is positioned at the extreme left-hand edge of the chart 50. Successive bar graphs are produced which facilitate the interpretation of the operation of the process.

In the operation of the present invention, the scanning control 42 initiates a scan of the four gauges 22–28 and maintains the recorder 40 clamped. When the sheet 20 has been scanned, control unit 42 unclamps the recorder and energizes the multiplexer 38. Multiplexer 38 may be a programmed stepping switch for successively connecting each of the inputs thereto to the recorder 40 for a predetermined length of time, usually two or three seconds. After the output of computer 36 is read out, the recorder pen is again clamped at the left edge of the chart by the scanning control unit 42. And, if the computers used at 30–36 are integrating capacitors, they may be reset at this time to prepare for receiving further process information in the next scan. At the completion of the sequential recording of average weights, another scan is initiated, preferably in the return or opposite scan direction, by the control unit 42 and the above sequence is repeated.

Inasmuch as the average values of cross-sheet basis weight are available for readout only during the short period at the end of each scan, it may be desirable to increase the speed of the chart 50 during this time and to slow the same during scans. A two-speed chart motor 54 controlled by the scanning control unit 42 may be provided to drive the chart 50 at a fast rate during recording of the averages and at a slow rate during scans.

An apparatus in accordance with this invention for automatically carrying out the recording method thereof is most simply constructed by modification of a control system similar to that described in an article entitled "Computers Team With Nuclear Gauges to Control a Paper Saturating Process" appearing in the December 1955 issue of Control Engineering. This control system is manufactured and marketed by Industrial Nucleonics Corporation, Columbus, Ohio. The system includes a plurality of gauges similar to that described in Patent No. 2,829,268, or in the copending application of Foster et al. Serial No. 662,672, filed May 31, 1957, now Patent No. 2,951,161, having automatic program-controlled traversing arrangement. These patents describe programmed timer devices for causing the gauge to periodically traverse a measured sheet from side to side and to dwell at the edge thereof while a switching sequence is carried out under control of an auxiliary timer arrangement. The modification of this basic system to incorporate the averaging computer device programmed by the scanning control is described in the copending application of Hickman et al., Serial No. 777,928, filed December 3, 1958, now Patent No. 3,007,052.

Recorders having multiplex inputs are old in the art, as appears for example from Patent No. 2,467,929, which discloses in FIG. 2 a multiplexing switch drive motor 170. Proper time relationship between this multiplex drive and the gauge traversing drive ararngement may be obtained simply by connecting this motor in parallel with the timer motor 214 in a circuit similar to that shown in FIG. 6 of the aforementioned Patent No. 2,829,268. A circuit including an averaging computer and including means whereby the recorder pen may be driven to any selected point on the chart during a clamping interval is disclosed in the copending application of Sidney A. Radley et al., Serial No. 668,935, filed July 1, 1957, now Patent No. 2,965,300.

The recorder used may be the strip-chart Dynamaster instrument which is manufactured and marketed by the Bristol Company of Waterbury, Connecticut as described in their Bulletin No. P1245-A, September 1957. The two-speed chart drive arrangement for this recorder is the T84 attachment described in their Bulletin No. P1210.1.9.6-16, February 1958 and additionally on Page 10 of Bulletin No. P1210.1-2, March 1958. The speed change switching may be done by a pair of spare relay contacts operating in synchronism with contacts 106b shown in the aforementioned Patent No. 3,007,052.

Although the present invention has been described to read out basis weight of the paper sheet 20, it should be appreciated that coating thickness, density, moisture or other characteristic may be read out in a similar manner merely by choosing a transducer responsive to the desired characteristic. Accordingly, the chart display of process information described hereinabove is believed to be novel. The results obtained by utilizing this form of presentation are totally unexpected and quite useful. However, it should be appreciated that numerous additions, substitutions and omissions may be made in the preferred embodiment without departing from the true spirit or scope of the invention or sacrificing any of its attendant advantages.

What is claimed is:

1. The method of utilizing a recorder having a continuously moving display chart and a marking indicator movable normal to said chart movement for summarizing the measurements of a sheet having a product characteristic being altered in a series of stages comprising the steps of measuring the variations in said product characteristic after each of said alterations, computing the average of each of said measurements, and periodically displacing said marking indicator in succession from a point on said chart in proportion to each of said computed averages.

2. The method of claim 1 further including the step of maintaining said marking indicator at each of said displacements for a predetermined length of time.

3. The method of utilizing a recorder including a continuously moving display chart and a marking indicator movable normal to said chart movement and a plurality of traversing gauges for scanning the width of a paper sheet having a product characteristic being altered in a series of stages comprising the steps of measuring the cross-sheet variations in said product characteristic before the initial alteration of said sheet and after each of said alterations thereof during a scan in one direction, computing the average of each of said cross-sheet measurements, displacing said marking indicator in succession from a point on said chart in proportion to each of said computed averages at the end of said scan, and maintaining each displacement of said indicator for a predetermined length of time.

4. The method of claim 3 further including the step of repeating said operation when all of said computed averages have been indicated.

5. Apparatus for utilizing a recorder having a continuously moving display chart and a marking indicator movable normal to said chart movement for summarizing the measurements of a sheet having a product characteristic being altered in a series of stages comprising means for measuring the variations in said product characteristic after each of said alterations, means for computing the average of each of said measurements, and means for periodically displacing said marking indicator in succession from a point on said chart in proportion to each of said computed averages.

6. Apparatus for utilizing a recorder including a continuously moving display chart and a marking indicator movable normal to said chart movement and a plurality of traversing gauges for scanning the width of a paper sheet having a product characteristic being altered in a series of stages comprising means for measuring the cross-sheet variations in said product characteristic before the initial alteration of said sheet and after each of said alterations thereof during a scan in one direction, means for computing the average of each of said cross-sheet measurements, means for displacing said marking indicator in succession from a point on said chart in proportion to each of said computed averages at the end of said scan, and means for maintaining each displacement of said indicator for a predetermined length of time.

7. Apparatus substantially as set forth in claim 6 which further includes means for repeating said operation when all of said computed averages have been indicated.

8. Apparatus for utilizing a recorder including a continuously moving display chart and a marking indicator movable normal to said chart movement and a plurality of traversing gauges for scanning the width of a paper sheet having a coating material applied in several different stages to produce a finished sheet comprising means for measuring the cross-sheet variations in the basis weight of said sheet before the initial coat and after each additional coat is applied thereto during a scan in one direction, integrator means for computing the average of each of said basis weight measurements, means for clamping said marking indicator in a predetermined fixed position relative to said chart during said measuring and computing operations, means for subsequently unclamping and displacing said marking indicator in succession from one side of said chart in proportion to each of said computed average weights, means for maintaining said indicator at each of said displacements for a predetermined length of time, and means for repeating said steps for a return scan of said gauges.

9. Apparatus substantially as set forth in claim 8 further including means for slowing the speed of said display chart during said weight measurement and computing operations and increasing the speed thereof during displacement of said marking indicator.

References Cited in the file of this patent
UNITED STATES PATENTS

| | | |
|---|---|---|
| 1,085,511 | Thwing | Jan. 27, 1914 |
| 2,199,010 | Robb | Apr. 30, 1940 |
| 2,467,929 | Colt | Apr. 19, 1949 |
| 2,688,459 | Merrill et al. | Sept. 7, 1954 |
| 2,712,128 | Woodruff | June 28, 1955 |